(12) United States Patent
Nomaru et al.

(10) Patent No.: US 7,932,478 B2
(45) Date of Patent: Apr. 26, 2011

(54) LASER PROCESSING MACHINE

(75) Inventors: Keiji Nomaru, Ota-Ku (JP); Hiroshi Morikazu, Ota-ku (JP); Taiki Sawabe, Ota-ku (JP)

(73) Assignee: Disco Corporation, Tokyo (JP)

( * ) Notice: Subject to any disclaimer, the term of this patent is extended or adjusted under 35 U.S.C. 154(b) by 547 days.

(21) Appl. No.: 12/048,616

(22) Filed: Mar. 14, 2008

(65) Prior Publication Data
US 2008/0245779 A1    Oct. 9, 2008

(30) Foreign Application Priority Data

Apr. 5, 2007    (JP) .................................. 2007-099767

(51) Int. Cl.
*B23K 26/06* (2006.01)
*B23K 26/36* (2006.01)

(52) U.S. Cl. .............................. 219/121.68; 219/121.75

(58) Field of Classification Search ............. 219/121.61, 219/121.78, 121.63–121.75; 438/460–465
See application file for complete search history.

(56) References Cited

U.S. PATENT DOCUMENTS

| | | | | |
|---|---|---|---|---|
| 4,121,883 A * | 10/1978 | Goshima et al. | ........... | 359/219.1 |
| 4,852,106 A * | 7/1989 | Hino et al. | ........................ | 372/9 |
| 5,043,965 A * | 8/1991 | Iida et al. | ................... | 369/44.13 |
| 5,225,924 A * | 7/1993 | Ogawa et al. | ............. | 359/196.1 |
| 5,287,125 A * | 2/1994 | Appel et al. | ................... | 347/259 |
| 6,986,982 B2 | 1/2006 | Ohkuma et al. | | |
| 7,019,891 B2 * | 3/2006 | Johnson | ........................ | 359/311 |
| 7,040,735 B2 | 5/2006 | Donaldson et al. | | |
| 7,355,157 B2 * | 4/2008 | Morikazu | ................... | 250/208.1 |
| 7,408,129 B2 * | 8/2008 | Morikazu et al. | ........ | 219/121.75 |

FOREIGN PATENT DOCUMENTS

| | | | | |
|---|---|---|---|---|
| JP | 363224043 A | * | 9/1988 | |
| JP | 406081029 A | * | 3/1994 | |
| JP | A 2006-51517 | | 2/2006 | |

* cited by examiner

*Primary Examiner* — Samuel M Heinrich
(74) *Attorney, Agent, or Firm* — Greer, Burns & Crain, Ltd.

(57) ABSTRACT

A laser processing machine that includes a chuck table adapted to hold a workpiece thereon and laser beam irradiation unit for applying a laser beam to the workpiece held on the chuck table. The laser beam irradiation unit includes: a laser beam oscillation section for emitting a pulse laser beam; a defection section for deflecting the pulse laser beam emitted from the laser beam oscillation section; and a concentrator having an ellipsoidal focusing spot forming section for focusing the pulse laser beam deflected by the deflection unit and forming a focusing spot into an ellipse.

6 Claims, 17 Drawing Sheets

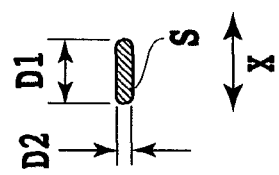
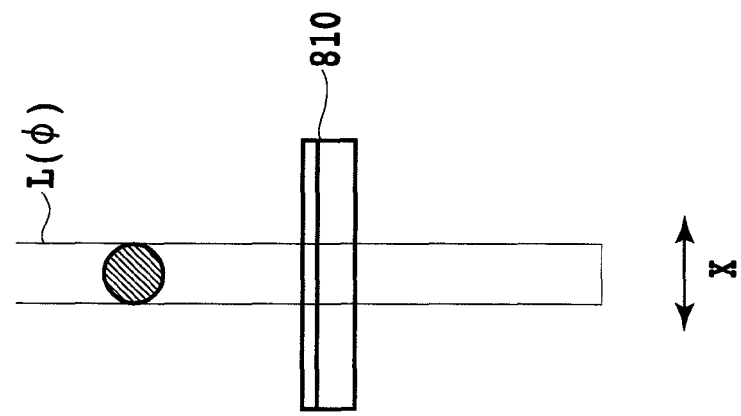
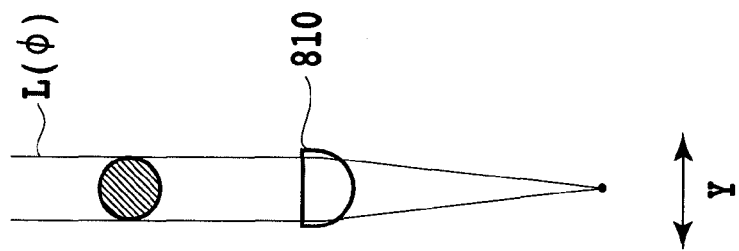

LASER PROCESSING MACHINE

BACKGROUND OF THE INVENTION

1. Field of the Invention

The present invention relates to a laser processing machine suitable to form a process trench with a predetermined width, length and depth in the front surface of a workpiece such as a wafer or the like.

2. Description of the Related Art

For example, a printer head used in an inkjet printer is formed with an ink-holder trench measuring 30 to 200 μm in width, 10 to 15 mm in length and 100 to 200 μm in depth. Such an ink-holder trench is formed by etching, which is disclosed in e.g. U.S. Pat. Nos. 7,040,735 and 6,986,982. In order to form the ink-holder trench by etching, it is necessary to mask an area to be formed with no ink-holder trench in the front surface of a workpiece such as a wafer or the like. Thus, productivity is poor and it is difficult to sharply form the wall surfaces of the trench.

On the other hand, laser processing has been put into practical use as a productive processing method. A laser processing method is disclosed by Japanese Patent Laid-Open No. 2006-51517. In this method, a focusing spot is shaped ellipsoidal, the major axis of the ellipsoidal focusing spot is positioned along the processing line of a workpiece and the workpiece is transferred in the process transfer direction.

It is necessary to apply laser beams to one and the same position more than once in order to form a process trench with a predetermined depth by laser processing. The laser processing method described in the above patent document needs to transfer the workpiece by the distance corresponding to the length of the processing trench set in the process-transfer direction. Therefore, it needs to transfer the workpiece in the process-transfer direction the number of times necessary to process it to a preset depth. For this reason, it is limited to increase the process-transfer speed in view of the inertia force of a chuck table mechanism for holding the workpiece. Consequently, the laser processing method described above is not necessarily satisfied in view of productivity.

SUMMARY OF THE INVENTION

Accordingly, it is an object of the present invention to provide a laser processing machine that can efficiently process a process trench with a predetermined width, length and depth.

In accordance with an aspect of the present invention, there is provided a laser processing machine including: a chuck table adapted to hold a workpiece thereon; and laser beam irradiation means for applying a laser beam to the workpiece held on the chuck table, the laser beam irradiation means including: laser beam oscillation means for emitting a pulse laser beam; deflection means for deflecting the pulse laser beam emitted from the laser beam oscillation means; and a concentrator having ellipsoidal focusing spot forming means for focusing the pulse laser beam deflected by the deflection means and forming a focusing spot into an ellipse.

Preferably, the ellipsoidal focusing spot forming means is composed of a cylindrical lens which is a convex lens.

The ellipsoidal focusing spot forming means includes a first cylindrical lens composed of a concave lens; a second cylindrical lens composed of a convex lens disposed on the downstream side of the first cylindrical lens in a laser beam irradiation direction; and an interval adjusting mechanism which adjusts the interval between the first cylindrical lens and the second cylindrical lens.

Preferably, the deflection means is composed of acoustooptic deflection means that includes an acoustooptic element which deflects the pulse laser beam emitted by the laser beam oscillation means, an RF oscillator which applies an RF to the acoustooptic element, and a deflection angle adjusting means for adjusting the frequency of the RF output from the RF oscillator. In addition, the deflection means deflects the pulse laser beam emitted from the laser beam oscillation means in a direction of a major axis of an ellipsoidal focusing spot onto which the pulse laser beam is focused by the concentrator.

Alternatively, the deflection means is composed of acoustooptic deflection means that includes an acoustooptic element which deflects the pulse laser beam emitted by the laser beam oscillation means, an RF oscillator which applies an RF to the acoustooptic element, and a deflection angle adjusting means for adjusting an RF frequency output from the RF frequency. In addition, the deflection means deflects the pulse laser beam emitted from the laser beam oscillation means in a direction of a minor axis of an ellipsoidal focusing spot onto which the pulse laser beam is focused by the concentrator.

Alternatively, the deflection means includes: first acoustooptic deflection means that includes: a first acoustooptic element which deflects a pulse laser beam emitted by the laser beam oscillation means; a first RF oscillator which applies an RF to the first acoustooptic element; and a first deflection angle adjusting means for adjusting the frequency of the RF output from the first RF oscillator; and that deflects the pulse laser beam emitted by the laser beam oscillation means in a direction of a major axis of an ellipsoidal focusing spot onto which the pulse laser beam is focused by the concentrator; and second acoustooptic deflection means that includes: a second acoustooptic element which deflects the pulse laser beam emitted by the laser beam oscillation means; a second RF oscillator which applies an RF to the second acoustooptic element; and a second deflection angle adjusting means for adjusting the frequency of the RF output from the second RF oscillator; and that deflects the pulse laser beam emitted by the laser beam oscillation means in a direction of a minor axis of an ellipsoidal focusing spot onto which the pulse laser beam is focused by the concentrator.

The laser processing machine according to the aspect of the present invention is such that the laser beam irradiation means includes: laser beam oscillation means for emitting a pulse laser beam; deflection means for deflecting the pulse laser beam emitted from the laser beam oscillation means; and a concentrator having ellipsoidal focusing spot forming means for focusing the pulse laser beam deflected by the deflection means and forming a focusing spot into an ellipse. Therefore, a workpiece can be formed with a process trench having a predetermined width, length and depth by allowing the deflection means to deflect the ellipsoidal focusing spot formed by the ellipsoidal focusing spot forming means. Thus, it is not necessary to move the chuck table adapted to hold the workpiece, which can increase processing speed to enhance productivity.

The above and other object, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 18A, 18B and 18C are explanatory diagrams illustrating a state where an ellipsoidal focusing spot is formed by a cylindrical lens composed of a convex lens as ellipsoidal focusing spot forming means constituting the laser beam irradiation means shown in FIG. 17.

DETAILED DESCRIPTION OF THE PREFERRED EMBODIMENTS

Figure 1:
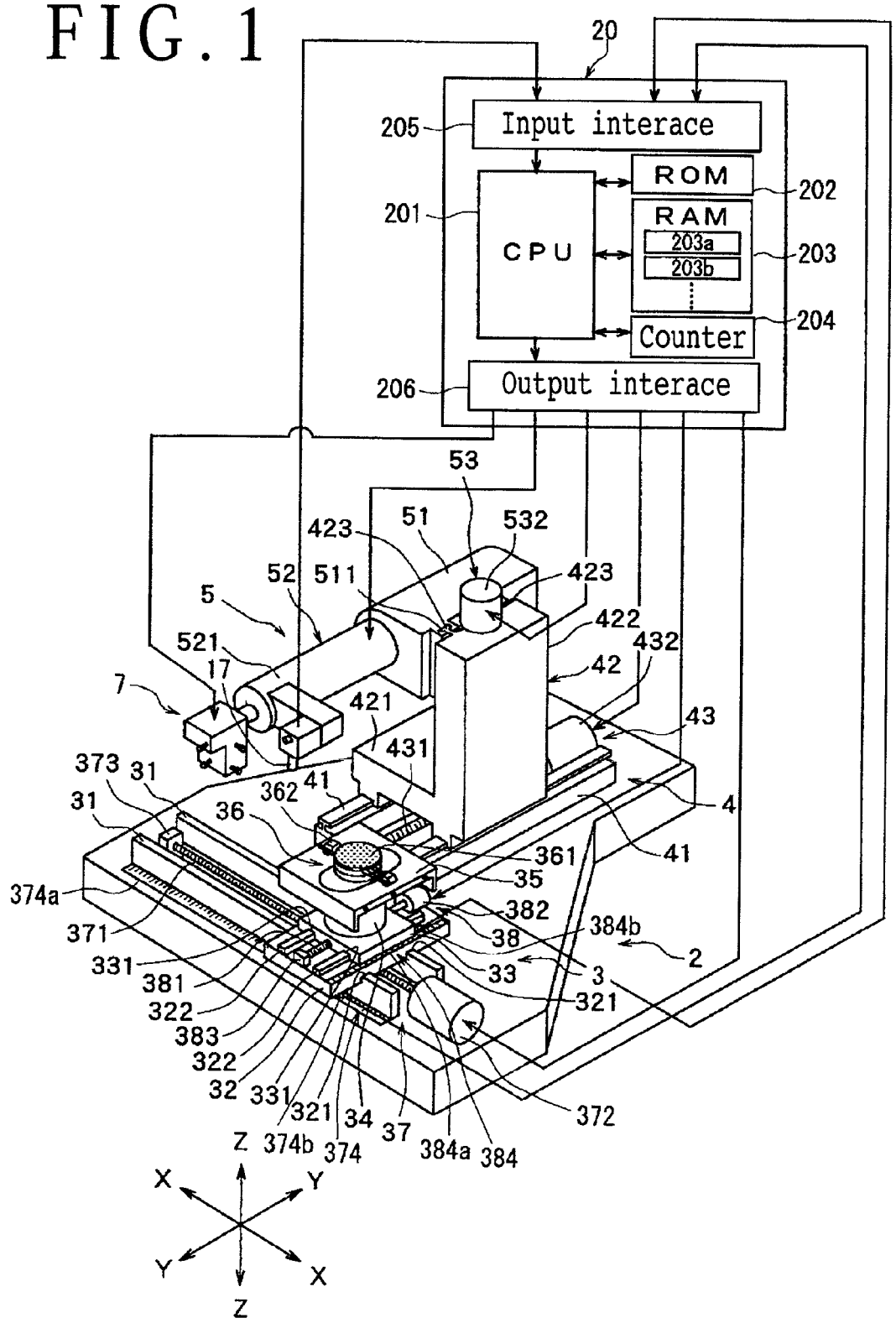
FIG. 1 is a perspective view of a laser processing machine configured according to the present invention.

Preferred embodiments of a laser processing machine configured according to the present invention will hereinafter be described with reference to the accompanying drawings. FIG. 1 is a perspective view of the laser processing machine configured according to the present invention. The laser processing machine shown in FIG. 1 includes a stationary base 2; a chuck table mechanism 3; a laser beam irradiation unit support mechanism 4; and a laser beam irradiation unit 5. The chuck table mechanism 3 is adapted to hold a workpiece that is placed on the stationary base 2 so as to be movable in a process-transfer direction indicated with arrow X. The laser beam irradiation unit support mechanism 4 is disposed on the stationary base 2 so as to be movable in an indexing-transfer direction indicated with arrow Y perpendicular to the direction indicated with arrow X mentioned above. The laser beam irradiation unit 5 is disposed on the laser beam unit support mechanism 4 so as to be movable in a direction indicated with arrow Z.

The chuck table mechanism 3 includes a pair of guide rails 31, 31; a first slide block 32; a second slide block 33; a cover table 35; a chuck table 36 as workpiece holding means. The guide rails 31, 31 are disposed on the stationary base 2 so as to be parallel to the process-transfer direction indicated with arrow X. The first slide block 32 is disposed on the guide rails 31, 31 so as to be movable in the process-transfer direction (X-axial direction) indicated with arrow X. The second slide block 33 is disposed on the first slide block 32 so as to be movable in the indexing-transfer direction (Y-axial direction) indicated with arrow Y. The cover table 35 is supported on the second slide block 33 by a cylindrical member 34. The chuck table 36 serves as workpiece holding means and is provided with a suction chuck 361 formed of porous material. The chuck table 36 is adapted to hold e.g. a disklike semiconductor wafer or a workpiece by suction means not shown. The chuck table 36 configured as described above is turned by a pulse motor not shown disposed in the cylindrical member 34.

The first slide block 32 is provided on a lower surface with a pair of to-be-guided grooves 321, 321 fitted to the pair of guide rails 31, 31 and also on an upper surface with a pair of guide rails 322, 322 formed to extend parallel to the indexing-transfer direction indicated with arrow Y. Since the to-be-guided grooves 321, 321 are fitted to the pair of guide rails 31, 31, the first slide block 32 configured described above can be moved along the pair of guide rails 31, 31 in the process-transfer direction indicated with arrow X. The chuck table mechanism 3 is provided with process-transfer means 37 for moving the first slide block 32 along the pair of guide rails 31, 31 in the process-transfer direction indicated with arrow X. The process-transfer means 37 includes an external thread rod 371 disposed between and parallel to the pair of guide rails 31, 31 and a drive source such as a pulse motor 372 for turnably driving the external thread rod 371. The external thread rod 371 has one end turnably supported by a bearing block 373 secured to the stationary base 2 and the other end connected for transmission to the output shaft of the pulse motor 372. Incidentally, the external thread rod 371 is threadedly engaged with a through-internal screw hole formed in an internal thread block, not shown, provided to protrude from the central lower surface of the first slide block 32. In this way, the external thread rod 371 is normally or reversely turned by the pulse motor 372 to move the first slide block 32 along the guide rails 31, 31 in the process-transfer direction indicated with arrow X.

The second slide block 33 is provided on a lower surface with a pair of to-be-guided grooves 331, 331 fitted to the pair of guide rails 322, 322 provided on the upper surface of the first slide blocks 32. Since the to-be-guided grooves 331, 331 are fitted to the pair of guide rails 322, 322, the second slide block 33 can be moved in the indexing-transfer direction indicated with arrow Y. The chuck table mechanism 3 is provided with first indexing-transfer means 38 for moving the second slide block 33 in the indexing-transfer direction indicated with arrow Y along the pair of guide rails 322, 322 provided on the first slide block 32. The first indexing-transfer means 38 includes an external thread rod 381 disposed between and parallel to the pair of guide rails 322, 322; and a drive source such as a pulse motor 382 or the like for turnably driving the external thread rod 381. The external thread rod 381 has one end turnably supported by a bearing block 383 secured to the upper surface of the first slide block 32 and the other end transmission-connected to the output shaft of the pulse motor 382. Incidentally, the external thread rod 381 is threadedly engaged with a through-internal screw hole formed in an internal thread block, not shown, provided to protrude form the central lower surface of the second slide block 33. In this way, the external thread rod 381 is normally or reversely turned by the pulse motor 382 to move the second slide block 33 along the guide rails 322, 322 in the indexing-transfer direction indicated with arrow Y.

The laser beam irradiation unit support mechanism 4 includes a pair of guide rails 41, 41 disposed on the stationary base 2 so as to be parallel to and along the indexing-transfer direction indicated with arrow Y; and a movable support base 42 disposed on the guide rails 41, 41 to be movable in a direction indicated with arrow Y. The movable support base 42 includes a moving support portion 421 movably disposed on the guide rails 41, 41; and an attachment portion 422 attached to the moving support portion 421. The attachment portion 422 is provided on its lateral surface with a pair of guide rails 423, 423 parallelly extending in the direction indicated with arrow Z. The laser beam irradiation unit support mechanism 4 is equipped with a second indexing-transfer means 43 for moving the movable support base 42 along the pair of guide rails 41, 41 in the indexing-transfer direction indicated with arrow Y. The second indexing-transfer means 43 includes an external thread rod 431 disposed between and parallel to the pair of guide rails 41, 41 and a drive source such as a pulse motor 432 adapted to drivingly turn the external thread rod 431. One end of the external thread rod 431 is turnably supported by a bearing block not shown secured to the stationary base 2 and the other end is connected for transmission to the output shaft of the pulse motor 432. Incidentally, the external thread rod 431 is threadedly engaged with an internal screw hole formed in an internal screw block not shown provided to project from a central lower surface of the moving support portion 421 constituting part of the movable support base 42. Thus, the external thread rod 431 is normally or reversely turned by the pulse motor 432 to move the movable support base 42 along the guide rails 41, 41 in the indexing-transfer direction indicated with arrow Y.

The laser beam irradiation unit 5 is equipped with a unit holder 51 and with laser beam irradiation means 52 attached to the unit holder 51. The unit holder 51 is provided with a pair of to-be-guided grooves 511, 511 slidably fitted to the pair of guide rails 423, 423 provided on the attachment portion 422. The unit holder 51 is supported movably in a direction (the Z-axial direction) indicated with arrow Z by fitting the respective to-be-guided grooves 511, 511 to the guide rails 423, 423.

The laser beam irradiation unit 5 is equipped with moving means 53 for moving the unit holder 51 along the pair of guide rails 423, 423 in the direction indicated with arrow Z. The moving means 53 includes an external thread rod (not shown) disposed between the pair of guide rails 423, 423 and a drive source such as a pulse motor 532 for turnably driving the external thread rod. The external thread rod not shown is normally or reversely turned by the pulse motor 532 to move the unit holder 51 and the laser beam irradiation means 52 along the guide rails 423, 423 in the direction indicated with arrow Z. Incidentally, in the illustrated embodiment, the pulse motor 532 is normally turned to move the laser beam irradiation means 52 upward and reversely turned to move it downward.

Figure 2:
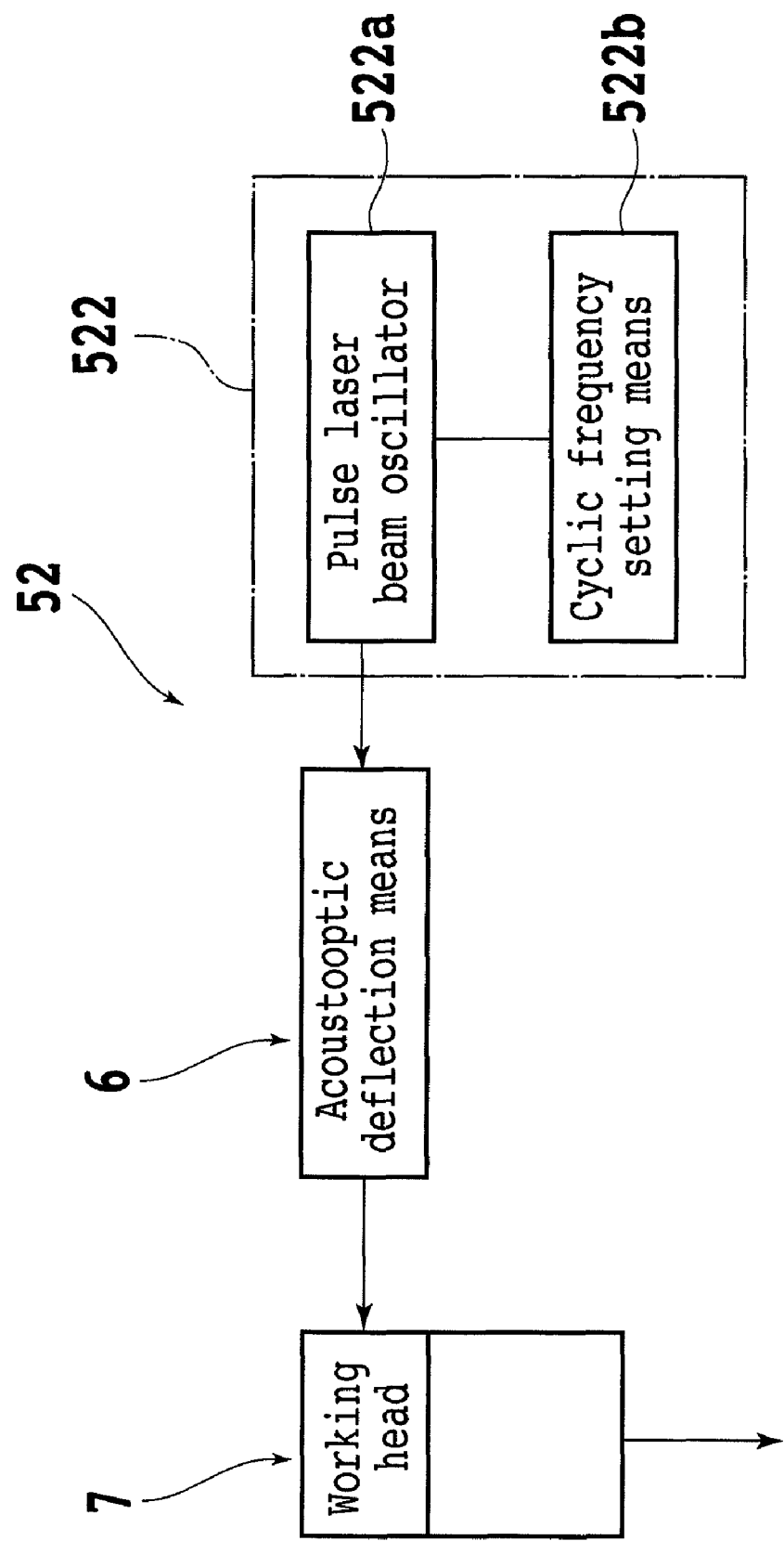
FIG. 2 is a block diagram of laser beam irradiation means installed in the laser processing machine shown in FIG. 1.

The laser beam irradiation means 52 is equipped with a cylindrical casing 521 that is secured to the unit holder 51 to extend substantially horizontally. As shown in FIG. 2, the laser beam irradiation means 52 includes pulse laser beam oscillation means 522, acoustooptic deflection means 6 and a working head 7. The pulse laser beam oscillation means 522 is disposed within the casing 521. The acoustooptic deflection means 6 serves as deflection means and is adapted to deflect the laser beam emitted from the pulse laser beam oscillation means 522 in the process-transfer direction (X-axial direction) and in the indexing-transfer direction (Y-axial direction). The working head 7 is disposed at the leading end of the casing 521 to irradiate the workpiece held on the chuck table 36 with the pulse laser beam emitted from the pulse laser beam oscillation means 522. The pulse laser beam oscillation means 522 includes a pulse laser beam oscillator 522a composed of a YAG laser oscillator or YVO4 laser oscillator; and a cyclic frequency setting means 522b attached to this oscillator 522a.

Figure 3:
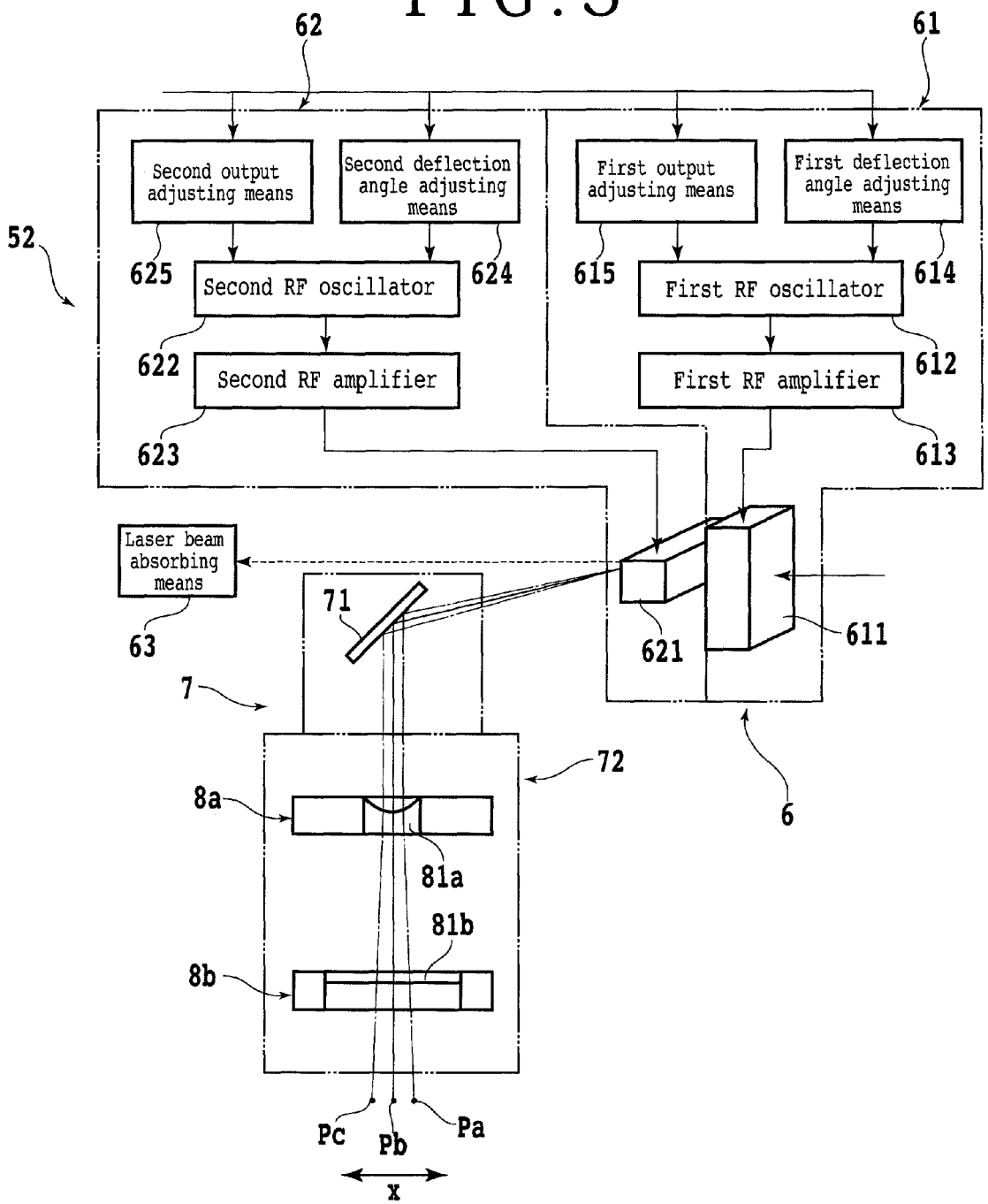
FIG. 3 is an explanatory diagram of a working head constituting part of the laser beam irradiation means shown in FIG. 2.

Referring to FIG. 3, the acoustooptic deflection means 6 includes first acoustooptic deflection means 61 for deflecting the laser beam emitted from the pulse laser beam oscillation means 522 in the process-transfer direction (X-axial direction); and second acoustooptic deflection means 62 for deflecting the laser beam emitted from the pulse laser beam oscillation means 522 in the indexing-transfer direction (Y-axial direction).

The first acoustooptic deflection means 61 includes a first acoustooptic element 611 which deflects the laser beam emitted from the pulse laser beam oscillating means 522 in the process-transfer direction (X-axial direction); a first RF oscillator 612 which generates RF (radio frequency) to be applied to the first acoustooptic element 611; and a first RF amplifier 613 which amplifies the power of the RF generated by the first RF oscillator 612 and applies it to the first acoustooptic element 611. The first acoustooptic deflection means 61 further includes first deflection angle adjusting means 614 which adjusts the frequency of the RF generated by the first RF oscillator 612; and first output adjusting means 615 which adjusts the amplitude of the RF generated by the first RF oscillator 612. The first acoustooptic element 611 can adjust an angle of the laser beam to be deflected in response to the frequency of the RF applied and adjust the output of the laser beam in response to the amplitude of the RF applied. Incidentally, the first deflection angle adjusting means 614 and the first output adjusting means 615 are controlled by control means described later.

The second acoustooptic deflection means 62 includes a second acoustooptic element 621 which deflects the laser beam emitted from the pulse laser beam oscillating means 522 in the indexing-transfer direction perpendicular to the process-transfer direction (X-axial direction); a second RF oscillator 622 which generates an RF to be applied to the second acoustooptic element 621; and a second RF amplifier 623 which amplifies the power of the RF generated by the RF oscillator 622 and applies it to the second acoustooptic element 621. The second acoustooptic deflection means 62 further includes second deflection angle adjusting means 624 which adjusts the RF generated by the second RF oscillator 622; and second output adjusting means 625 which can adjust the amplitude of the RF generated by the second RF oscillator 622. The second acoustooptic element 621 can adjust an angle of the laser beam to be deflected in response to the frequency of the RF applied and adjust the output of the laser beam in response to the amplitude of the RF applied. Incidentally, the second deflection angle adjusting means 624 and the second output adjusting means 625 are controlled by the control means described later.

Additionally, the acoustooptic deflection means 6 includes laser beam absorbing means 63 for absorbing the laser beam not deflected by the first acoustooptic element 611 as shown with a broken line in FIG. 3 if the RF is not applied to the first acoustooptic element 611.

The acoustooptic deflection means 6 is configured as described above and has a function as described below with reference to FIG. 3. A voltage of e.g. 5 V may be applied to the first deflection angle adjusting means 61 of the first acoustooptic deflection means 61 constituting part of the acoustooptic deflection means 6 and the frequency of the RF corresponding to 5 V may be applied to the first acoustooptic element 611. In this case, the pulse laser beam emitted from the pulse laser beam oscillation means 522 is deflected as shown with a chain line in FIG. 3 and focused on a focused point Pa via a direction-changing mirror 71 and a concentrator (condenser) 72, described later, of the working head 7. A voltage of e.g. 10 V may be applied to the first deflection angle adjusting means 614 and the frequency of the RF corresponding to 10 V may be applied to the first acoustooptic element 611. In this case, the pulse laser beam emitted from the pulse laser beam oscillating means 522 is deflected as shown with a solid line in FIG. 3 and focused on a focused point Pb via the direction-changing mirror 71 and concentrator 72, described later, of the working head 7. The focused point Pb is shifted leftward by a predetermined amount in FIG. 3 from the focused point Pa in the process-transfer direction (X-axial direction).

A voltage of e.g. 15 V may be applied to the first deflection angle adjusting means 614 and the frequency of the RF corresponding to 15 V may be applied to the first acoustooptic element 611. In this case, the pulse laser beam emitted from the pulse laser beam oscillating means 522 is deflected as shown with a two-dot chain line in FIG. 3 and focused on a focused point Pc via the direction-changing mirror 71 and concentrator 72, described later, of the working head 7. The focused point Pc is shifted leftward by a predetermined amount in FIG. 3 from the focused point Pb in the process-transfer direction (X-axial direction). On the other hand, a voltage of e.g. 0 V may be applied to the first deflection angle adjusting means 614 of the first acoustooptic deflection means 61 and the frequency of the RF corresponding to 0 V may be applied to the first acoustooptic element 611. In this case, the pulse laser beam emitted from the pulse laser beam oscillation means 522 is led to the laser beam absorbing means 63 as shown with the broken line in FIG. 3. As described above, the laser beam deflected by the first acoustooptic element 611 is deflected in the process-transfer direction (X-axial direction) in response to the voltage applied to the deflection angle adjusting means 614.

On the other hand, if the RF with a predetermined frequency is applied to the second acoustooptic element 621, the second acoustooptic deflection means 62 constituting part of the acoustooptic deflection means 6 allows the pulse laser beam emitted from the pulse oscillation means 522 to focus on a focused point shifted by a predetermined amount in an indexing-transfer direction (Y-axial direction: a direction perpendicular to the sheet surface in FIG. 3) perpendicular to the process-transfer direction (X-axial direction).

The working head 7 includes a direction-changing mirror 71; and the concentrator 72 provided with ellipsoidal focusing spot forming means for forming an ellipsoidal focusing spot. The direction-changing mirror 71 changes the direction of a pulse laser beam toward the concentrator 72, the pulse laser beam being emitted by the pulse laser beam oscillation means 522 and deflected by the acoustooptic deflection means 6.

Figure 4:
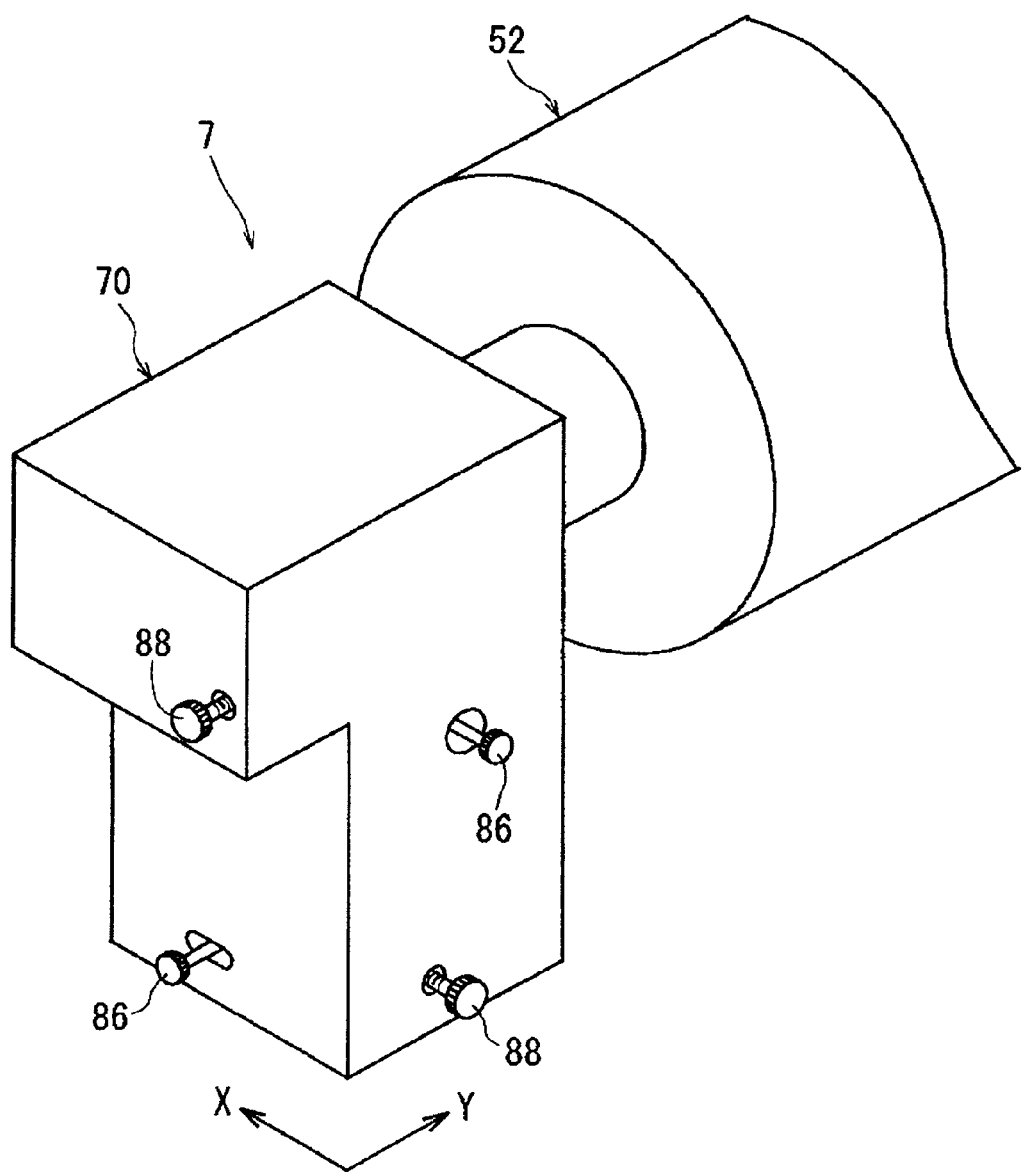
FIG. 4 is a perspective view of the working head shown in FIG. 3.

The concentrator 72 for forming an ellipsoidal focusing spot is equipped with the ellipsoidal focusing spot forming means. The ellipsoidal focusing spot forming means includes a first cylindrical lens unit 8a provided with a first cylindrical lens 81a; a second cylindrical lens unit 8b provided with a second cylindrical lens 81b positioned to have a light-focusing direction perpendicular to that of the first cylindrical lens 81a; and an interval adjusting mechanism, described later, for adjusting the interval between the first cylindrical lens unit 8a and the second cylindrical lens unit 8b. The direction-changing mirror 71, the first cylindrical lens unit 8a, the second cylindrical lens unit 8b and the interval adjusting mechanism described later are disposed in the working head housing 70 attached to the leading head of the casing 521 as shown in FIG. 4.

Figure 5:
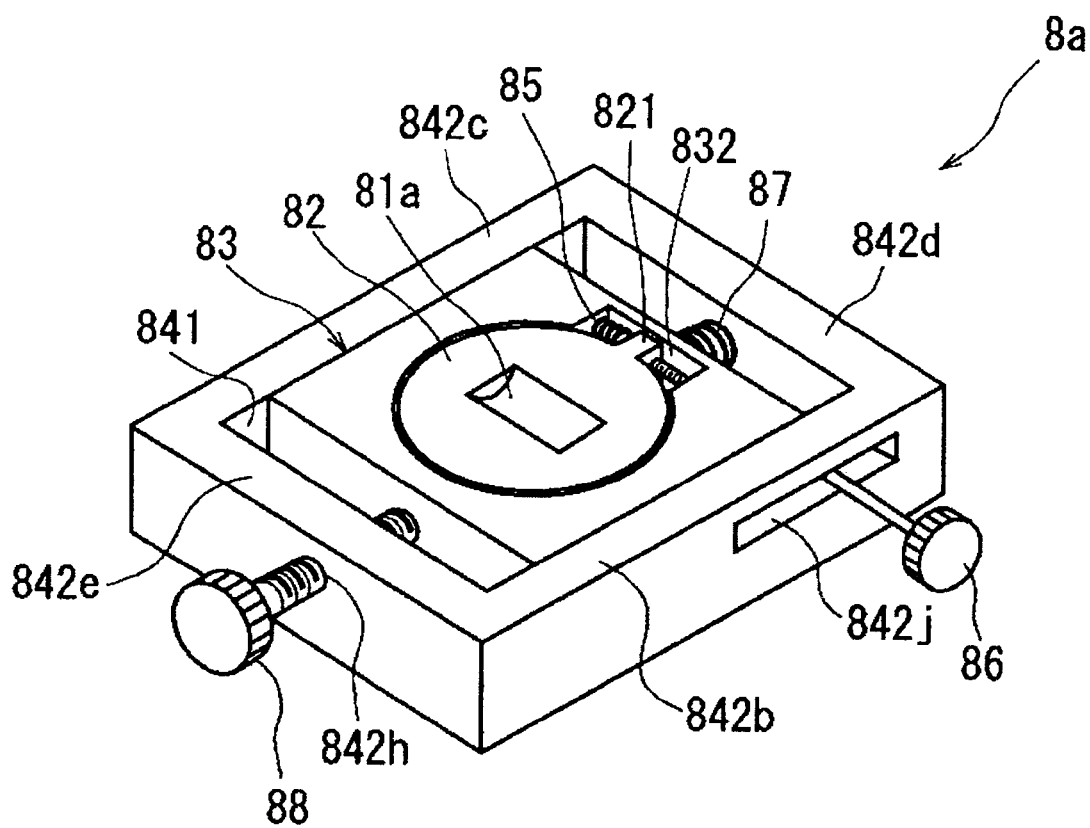
FIG. 5 is a perspective view of the first cylindrical lens unit constituting a concentrator of the working head shown in FIG. 3.
Figure 6:
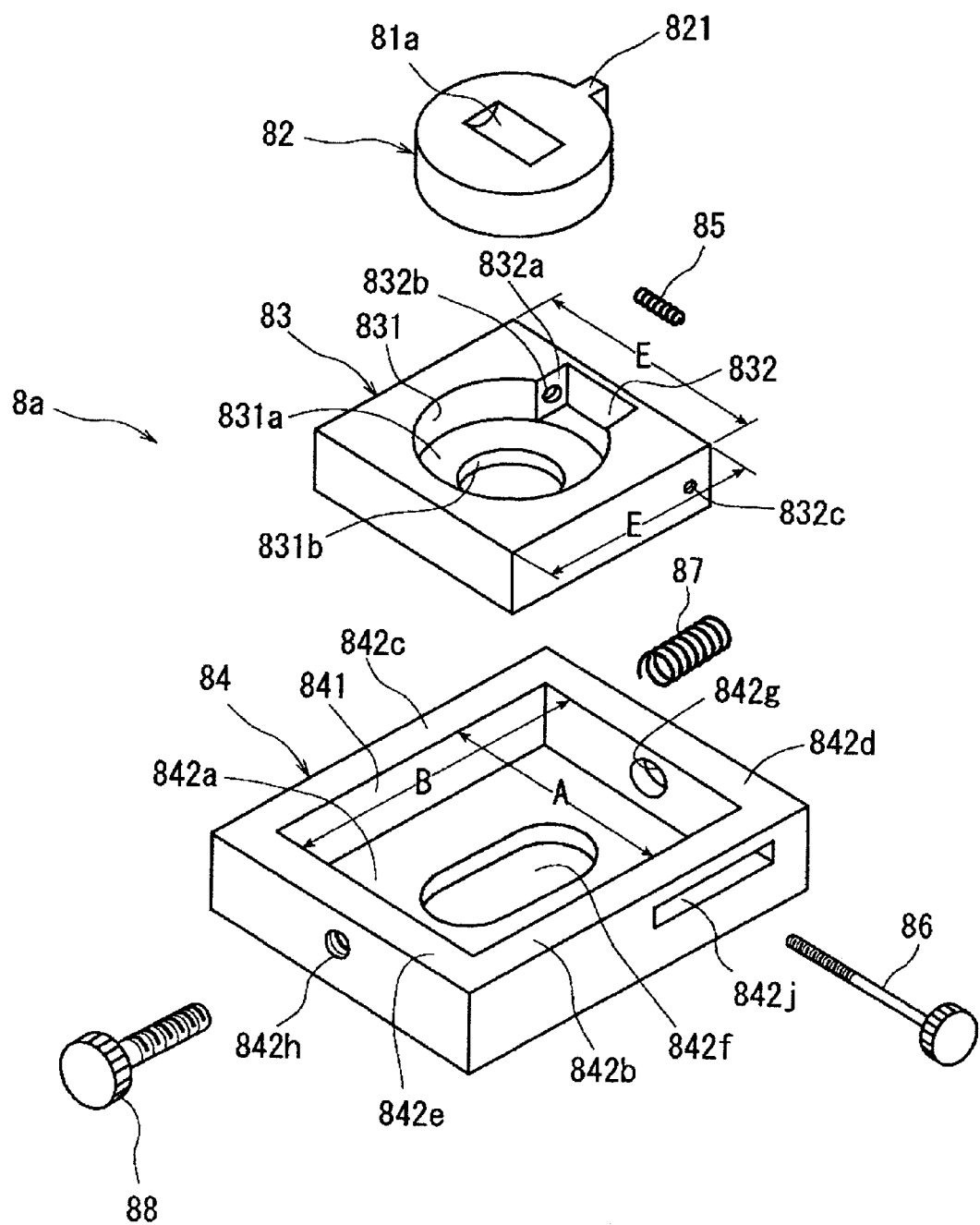
FIG. 6 is an exploded perspective view of a first cylindrical lens unit shown in FIG. 5.

The first cylindrical lens unit 8a is described with reference to FIGS. 5, 6 and 7. FIG. 5 is a perspective view of the first cylindrical lens unit 8a. FIG. 6 is an exploded perspective view of the first cylindrical lens unit 8a shown in FIG. 5. The first cylindrical lens 8a illustrated in FIGS. 5 and 6 includes the first cylindrical lens 81a; a lens holding member 82 holding the first cylindrical lens 81a; a first frame 83 holding the lens holding member 82; and a second frame 84 holding the first frame 83.

Figure 7:
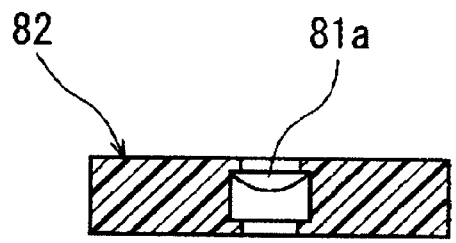
FIG. 7 is a cross-sectional view of a lens holding member holding the first cylindrical lens constituting the first cylindrical lens unit shown in FIG. 5.

The first cylindrical lens 81a is formed semicircularly in cross-section as shown in FIG. 7. The first cylindrical lens 81a is composed of a cylindrical lens which is a concave lens in the illustrated embodiment and has a focal length (f1) of −300 mm. The lens holding member 82 holding the first cylindrical lens 81a is made of synthetic resin in a circle. The first cylindrical lens 81a is embedded in the lens holding member 82 made of the synthetic resin so as to expose its upper and lower surfaces. The lens holding member 82 is formed with a to-be-operated piece 821 projecting from a portion of the outer circumferential surface thereof as shown in FIG. 6.

The first frame 83 is formed in a square having a side with a length of E as shown in FIG. 6. The first frame 83 is formed in the upper surface with a circular recessed portion 831 receiving the lens holding member 82 fitted thereinto. In addition, the first frame 83 is formed with an operation chamber 832 that receives therein the to-be-operated piece 821 provided on the lens holding member 82. A bottom wall 831a of the circular recessed portion 831 is formed with a hole 831b. A wall surface 832a defining the operating chamber 832 is formed with a recessed portion 832b serving as a spring seat. Incidentally, the first frame 83 is formed with a screw hole 832c on the axis of the recessed portion 832b. The first frame 83 configured as above is such that the lens holding member 82 is fitted into the circular recessed portion 831 and the to-be-operated piece 821 is received in the operation chamber 832 as shown in FIG. 5.

Thus, the lens holding member 82 fitted into the circular recessed portion 831 of the first frame 83 can be turned along the inner circumferential surface of the circular recessed portion 831 in a range where the to-be-operated piece 821 can be moved in the operation chamber 832. A helical compression spring 85 is interposed between the recessed portion 832b and the to-be-operated piece 821. The first adjustment screw 86 is threadedly engaged with the screw hole 832c and is abutted at a leading end against the to-be-operated piece 821. Thus, if the first adjustment screw 86 is turned in one direction to move forward, the lens holding member 82 is turned in one direction against the spring force of the helical compression spring 85. If the first adjustment screw 86 is turned in the other direction to move backward, the lens holding member 82 is turned in the other direction by the spring force of the helical compression spring 85. In this way, the to-be-operated piece 821 provided on the lens holding member 82, the first adjustment screw 86 and the helical compression spring 85 function as turning adjustment means for turning the lens holding member 82 along the inner circumferential surface of the circular recessed portion 831.

The second frame 84 is formed rectangular and has an upper surface formed with a rectangular recessed portion 841 adapted to receive the first frame 83 fitted thereinto as shown in FIG. 6. The rectangular recessed portion 841 is formed so as to have a width A corresponding to the length E of one side of the square first frame 83 and a length B greater than the length E of one side of the first frame 83. The rectangular recessed portion 841 is defined by a bottom wall 842a and lateral walls 842b, 842c, 842d, 842e. The bottom wall 842a is formed with a hole 842f at a central portion. The lateral wall 842d defining the rectangular recessed portion 841 is formed with a recessed portion 842g serving as a spring seat. The lateral wall 842e opposed to the lateral wall 842d formed with the recessed portion 842g is formed with a screw hole 842h. The lateral wall 842b of the second frame 84 is formed with an elongate hole 842j adapted to receive the first adjustment screw 86 insertably passed therethrough. As described in FIG. 5, the first frame 83 is fitted into the rectangular recessed portion 841 of the second frame configured as above.

A helical compression spring 87 is interposed between the recessed portion 842g formed in the inner surface of the lateral wall 842d and the lateral wall of the first frame 83. A second adjustment screw 88 is threadedly engaged with a screw hole 842h formed in the lateral wall 842e and has a leading end abutted against the lateral wall of the first frame 83. Thus, if the second adjustment screw 88 is turned in one direction to move forward, the first frame 83 is moved one direction against the spring force of the helical compression spring 87. If the second adjustment screw 88 is turned in the other direction to move backward, the first frame 83 is moved in the other direction by the spring force of the helical compression spring 87. In this way, the second adjustment screw 88 and the helical compression spring 87 function as movement adjusting means for moving the first frame 83 in a direction perpendicular to the light-focusing direction of the first cylindrical lens 81a with respect to the second frame 84.

Figure 8:
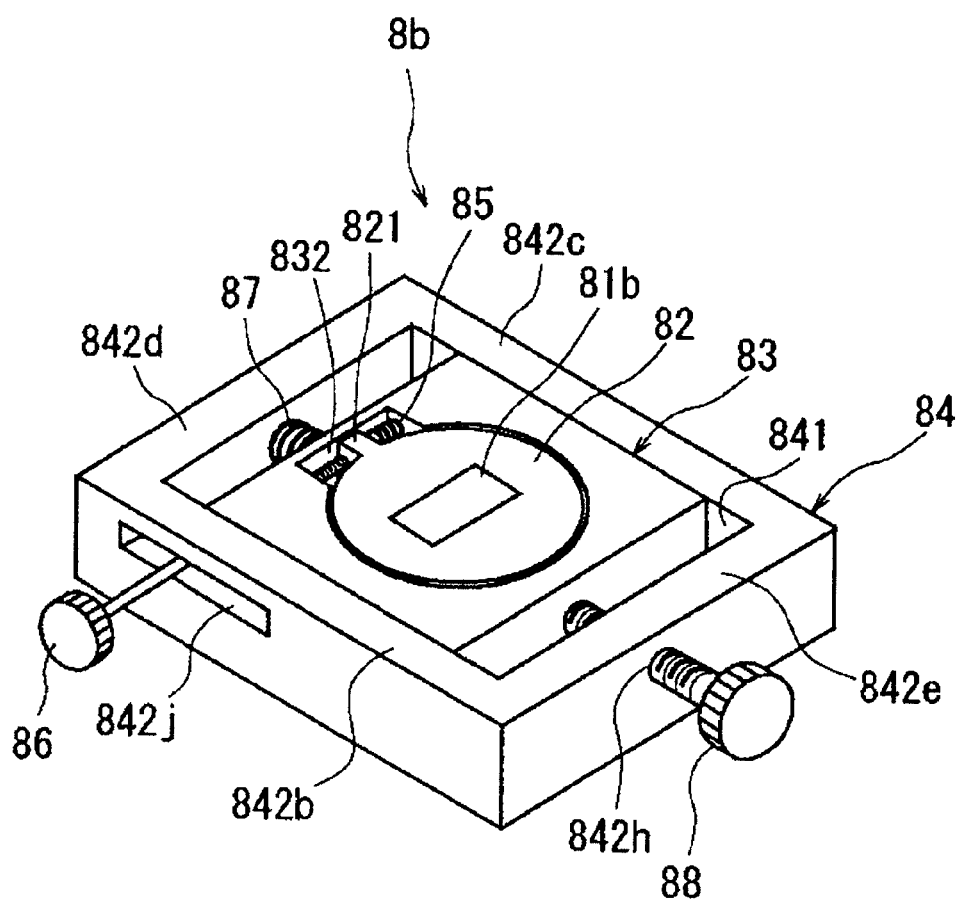
FIG. 8 is a perspective view of a second cylindrical lens unit constituting the concentrator of the working head shown in FIG. 3.
Figure 9:
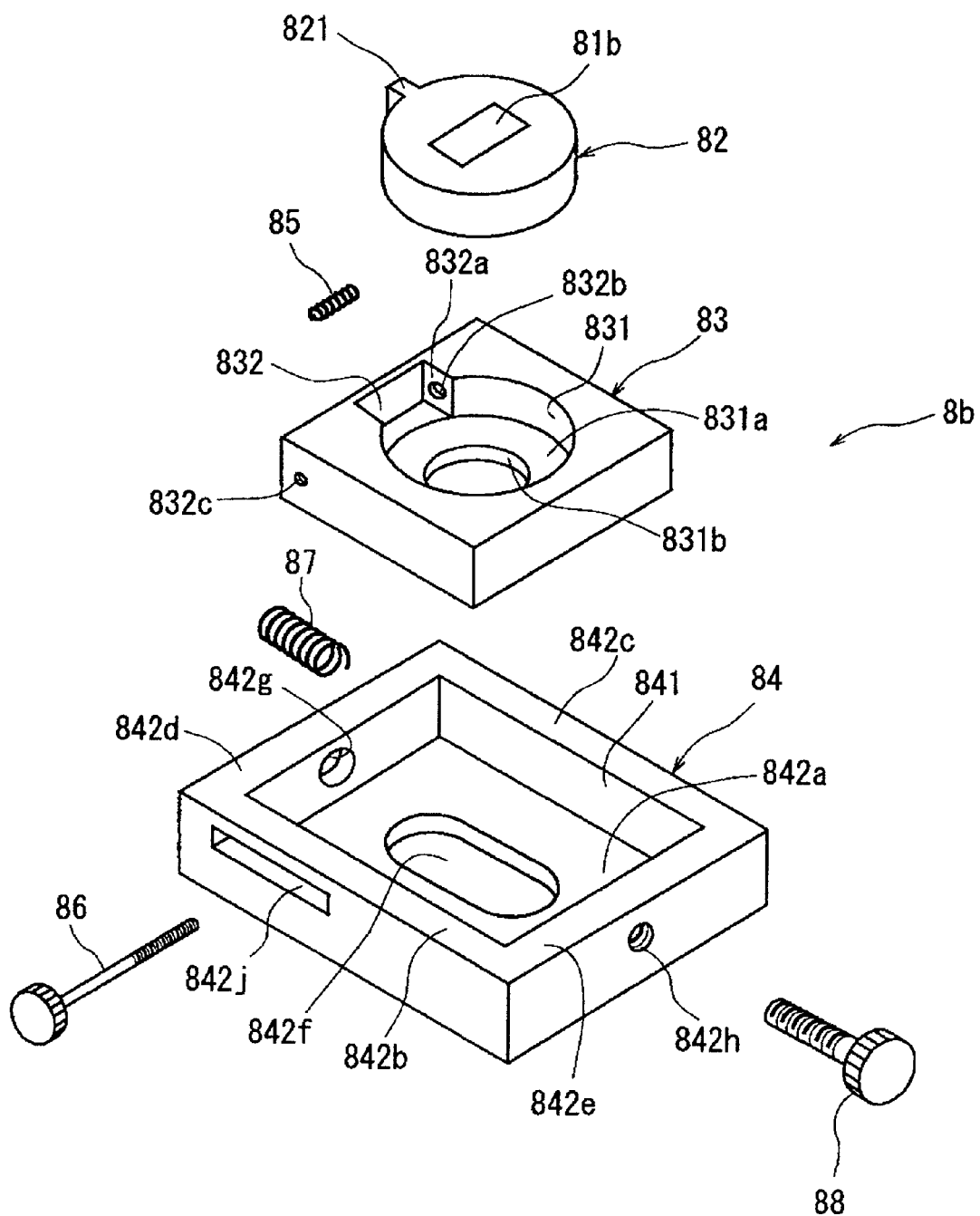
FIG. 9 is an exploded perspective view of constituting members of the second cylindrical lens unit shown in FIG. 8.

The second cylindrical lens unit 8b is next described with reference to FIGS. 8 and 9. FIG. 8 is a perspective view of the second cylindrical lens unit 8b and FIG. 9 is an exploded perspective view of the second cylindrical lens unit 8 shown in FIG. 8. Similarly to the first cylindrical lens unit 8a, also the second cylindrical lens unit 8b illustrated in FIGS. 8 and 9 includes a second cylindrical lens 81b; a lens holding member 82 holding the second cylindrical lens 81b; a first frame 83 holding the lens holding member 82; and a second frame 84 holding the first frame 83. The second cylindrical lens 81b is composed of a cylindrical lens which is a convex lens in the illustrated embodiment and has a focal length (f2) of 50 mm. Incidentally, the lens holding member 82, the first frame 83 and the second frame 84 constituting the second cylindrical lens unit 8b have substantially the same configurations as those of the lens holding member 82, the first frame 83 and the second frame 84, respectively, constituting the first cylindrical lens unit 8a. Therefore, like members are given like reference numerals and their detailed explanations are omitted.

Figure 10:
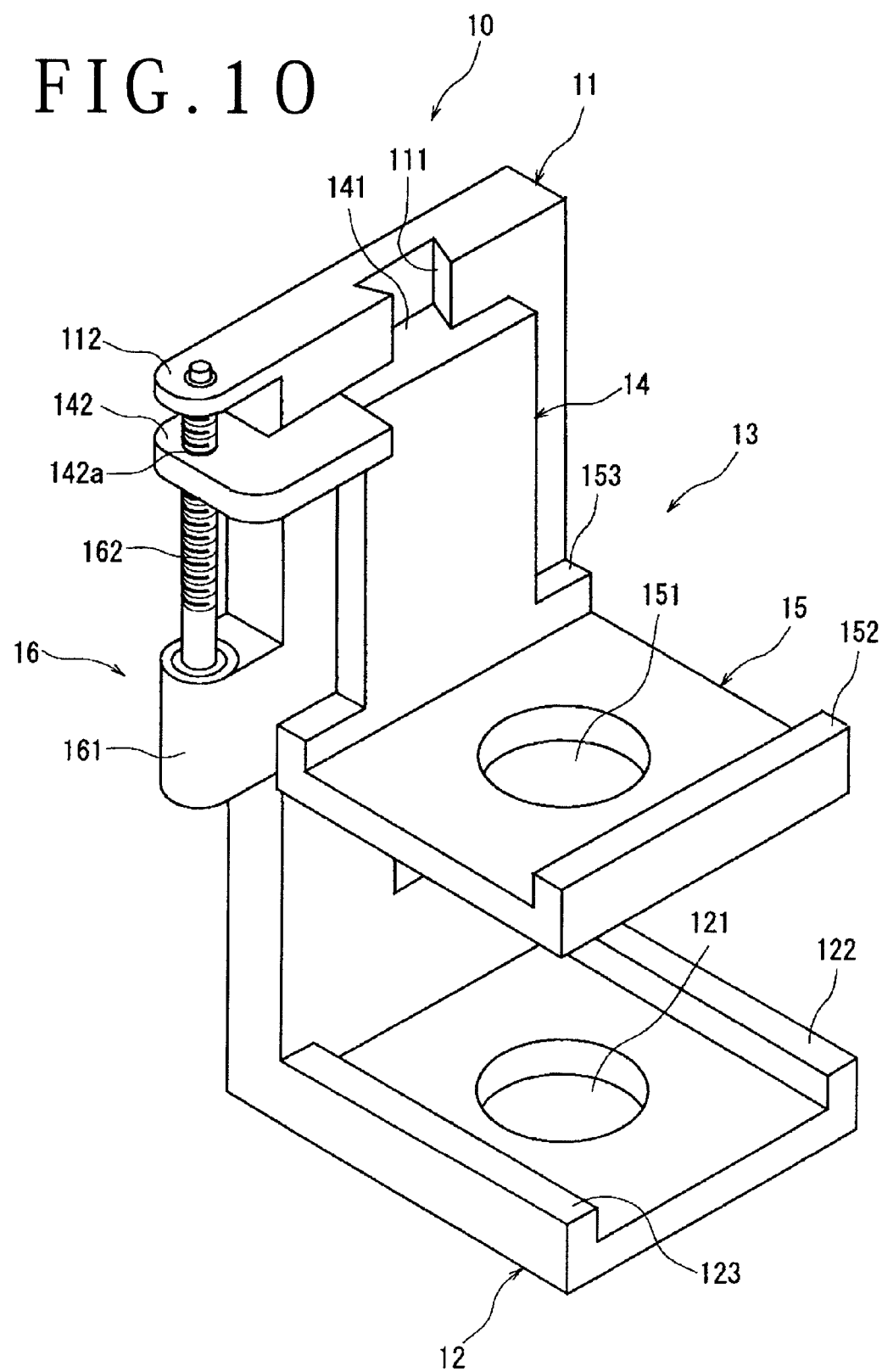
FIG. 10 is an interval adjusting mechanism for adjusting the interval between the first and second cylindrical lens units installed on the laser processing machine shown in FIG. 1.

The first and second cylindrical lens units 8a, 8b configured as described above are mounted on the interval adjusting mechanism 10 illustrated in FIG. 10. The interval adjusting mechanism 10 is next described. The interval adjusting mechanism 10 illustrated in FIG. 10 includes a support base 11; a first support table 12 provided at the lower end of the support base 11; and a second support table 13 disposed to be vertically movable along the front surface of the support base 11.

The support base 11 is provided with a guide groove 111 vertically formed at the front central portion. A first adjusting plate 112 is secured to the lateral intermediate portion of the support base 11. The first support table 12 is formed to project at a right angle relative to the front surface of the support base 11. The first support table 12 is formed with a hole 121 at a central portion. In addition, the first support table 12 is formed at both lateral ends with positioning rails 122, 123 extending at a right angle relative to the front surface of the support base 11. The interval between the positioning rails 122, 123 is set at a size corresponding to the width-directional size of the second frame 84 constituting part of the second cylindrical lens unit 8b.

The second support table 13 includes a support portion 14 and a table portion 15 provided at the lower end of the support portion 14. The support portion 14 is formed on the rear surface with a to-be-guided rail 141 fitted to a guide groove 111 formed in the support base 11. Since the to-be-guided rail 141 is fitted to the guide groove 111, the second support table 13 is supported to be vertically movable along the guide groove 111. Incidentally, a second adjusting plate 142 is secured to the upper end of the support portion 14 so as to be located below the first adjusting plate 112. The table portion 15 is formed to project at a right angle from the front surface of the support portion 14. The table portion 15 is formed with a hole 151 at a central portion. The table portion 15 is formed at front and rear ends with positioning rails 152 and 153, respectively, extending parallel to the front surface of the support portion 14. The interval between the positioning rails 152, 153 is set at a size corresponding to the width-directional size of the second frame 84 constituting part of the first cylindrical lens unit 8a.

The interval adjusting mechanism 10 is equipped with moving means 16 for vertically moving the second support table 13 along the guide groove 111 of the support base 11. The moving means 16 includes a pulse motor 161 attached to the moving means 16 and an external thread rod 162 turnably driven by the pulse motor 161 in the illustrated embodiment. The external thread rod 162 has one end connected to the drive shaft of the pulse motor 161 and the other end turnably supported by the bearing block 112 provided on the support base 11. The external thread rod 162 is threadedly engaged with a through-internal screw hole 142a formed in the second adjusting plate 142 secured to the upper end of the support portion 14 of the second support table 13. Thus, the external thread rod 162 is normally or reversely turned by the pulse motor 161 to vertically move the second support table 13 along the guide groove 111.

Figure 11:
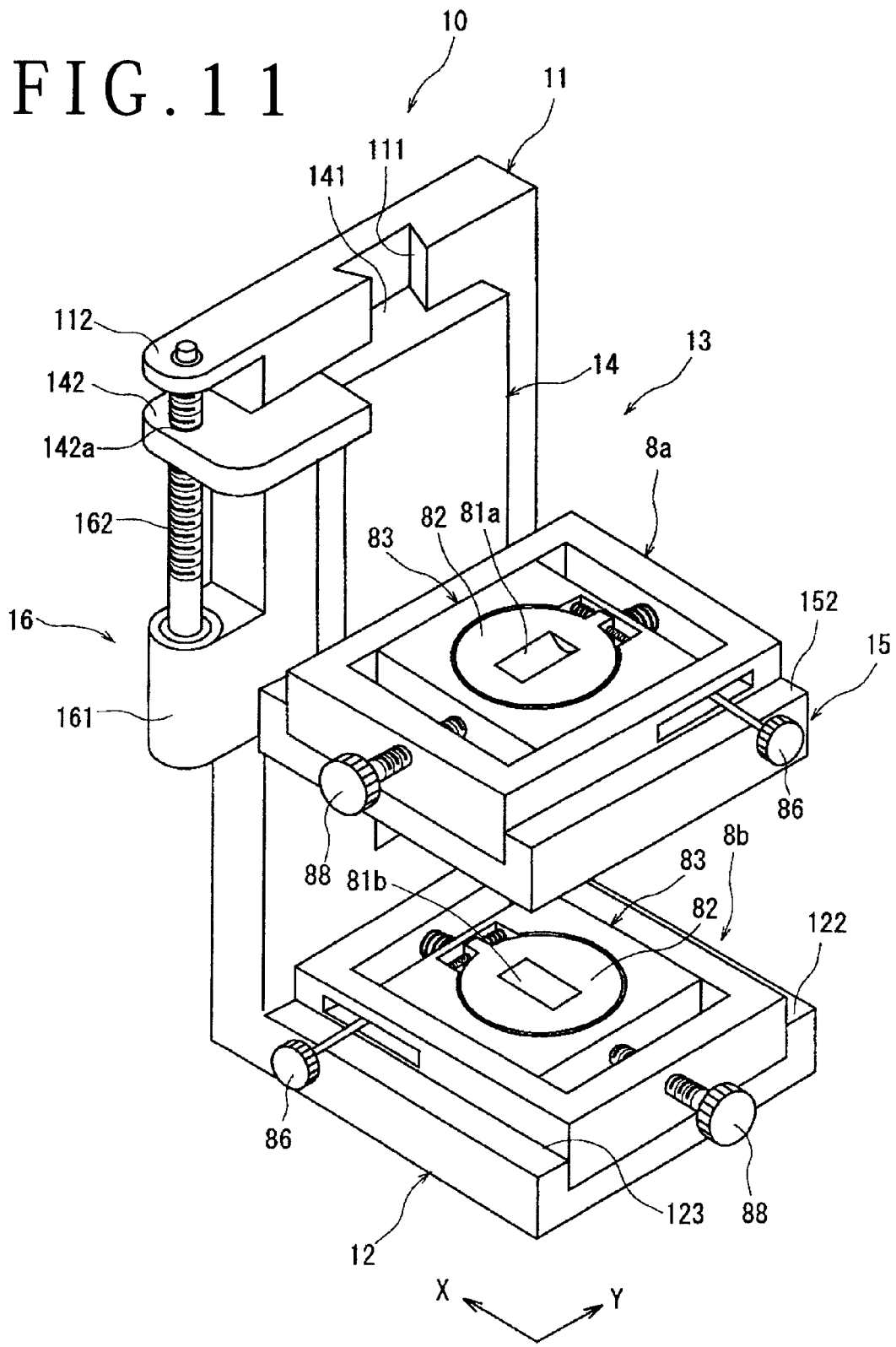
FIG. 11 is a perspective view illustrating a state where the first and second cylindrical units are installed in the interval adjusting mechanism shown in FIG. 10.

As shown in FIG. 11, the second cylindrical lens unit 8b is mounted on the first support table 12 of the interval adjusting mechanism 10 configured as above. More specifically, the second frame 84 of the second cylindrical lens unit 8b is placed between the positioning rails 122, 123 of the first support table 12. The second cylindrical lens unit 8b placed at a predetermined position on the first support table 12 is such that the light-focusing direction is set in the direction indicated with arrow Y in FIG. 11.

The first cylindrical lens unit 8a is mounted on the table portion 15 of the second support table 13 of the interval adjusting mechanism 10. More specifically, the second frame 84 of the first cylindrical lens unit 8a is placed between the positioning rails 152, 153 of the table portion 15 constituting part of the second support table 13. The first cylindrical lens unit 8a placed at a predetermined position on the table portion 15 of the second support table 13 is secured to the table portion 15 of the second support table 13 by appropriate securing means not shown. The cylindrical lens 81a of the first cylindrical lens unit 8a disposed on the table portion 15 of the second support table 13 as described above is such that the light-focusing direction is set in the direction indicated with symbol x in FIG. 11.

The concentrator (condenser) 72 in the illustrated embodiment is configured as described above. Specifically, the second cylindrical lens 81b of the second cylindrical lens unit 8b set on the first support table 12 is disposed on the downstream side of the laser beam irradiation direction of the first cylindrical lens 81a of the first cylindrical lens unit 8a set on the second support table 13. The operation of the concentrator 72 described above is described with reference to FIGS. 12A, 12B and 12C.

Figure 12:
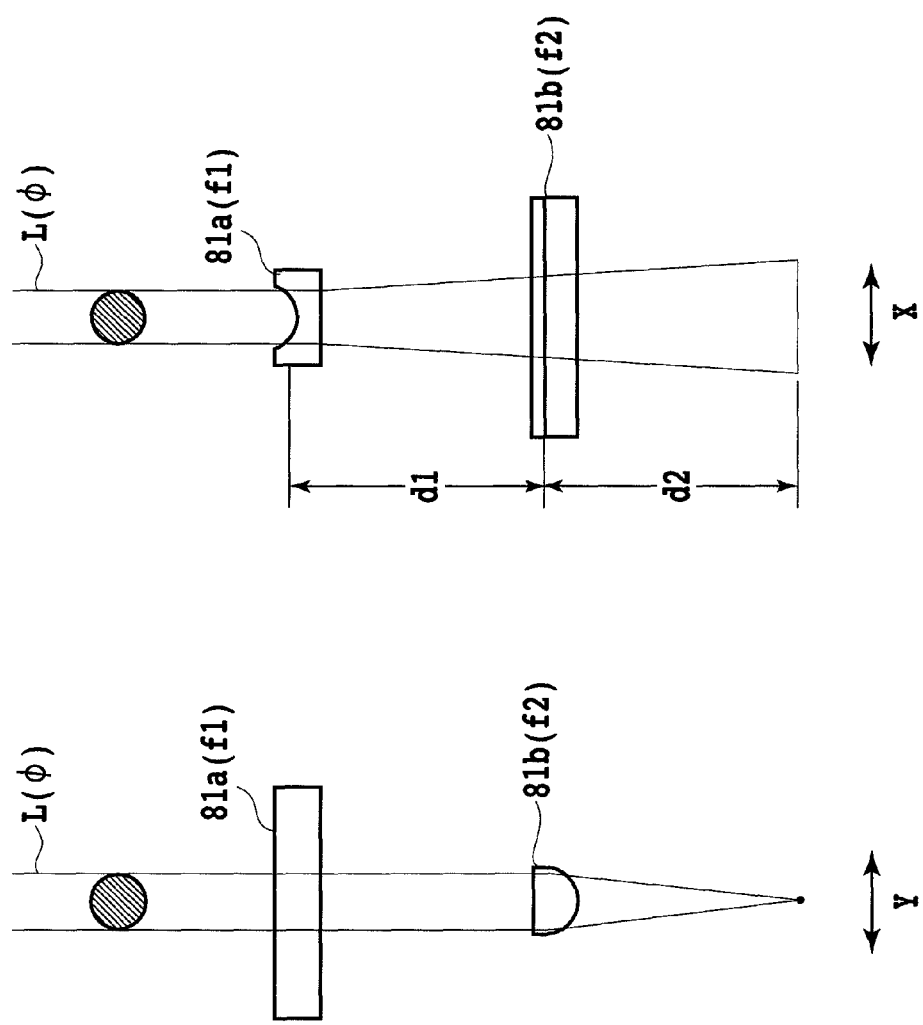
FIGS. 12A, 12B and 12C are explanatory diagrams illustrating a state where an ellipsoidal focusing spot is formed by the first and second cylindrical lenses as ellipsoidal focusing spot forming means.

FIG. 12A is a diagram for assistance in explaining the state where a laser beam L emitted from the pulse laser beam oscillation means 522 and directed to the concentrator 72 via the acoustooptic deflection means 6 and via the direction-changing mirror 71 is focused in the Y-axial direction by the first and second cylindrical lenses 81a, 81b. FIG. 12B is a diagram for assistance in explaining the state where the laser beam L is focused in the X-axial direction by the first and second cylindrical lenses 81a, 81b.

As shown in FIG. 12A, since the first cylindrical lens 81a composed of a concave lens does not focus light in the Y-axial direction, the laser beam L is focused in the Y-axial direction by the second cylindrical lens 81b composed of a convex lens. On the other hand, since the first cylindrical lens 81a composed of a concave lens focuses light in a minus direction in the X-axial direction, the laser beam L is expanded in the X-axial direction by the first cylindrical lens 81a. In addition, since the second cylindrical lens 81b composed of a convex lens does not focus light in the X-axial direction, the laser beam L passing through the second cylindrical lens 81b is applied while being expanded in the X-axial direction by the first cylindrical lens 81a. Consequently, the laser beam directed through the first and second cylindrical lenses 81a, 81b is shaped at a focusing spot S in an ellipse with a major axis D1 and a minor axis D2.

The major axis D1 of the ellipsoidal focusing spot S of the laser beam applied through the first and second cylindrical lenses 81a, 81b as described above can be changed in length by vertically moving the second support table 13 on which the first cylindrical lens unit 8a is set, along the guide groove 111 of the support base 11.

The following is assumed: The focal length of the first cylindrical lens 81a is f1. The focal length of the second cylindrical lens 81b is f2. The distance from the first cylindrical lens 81a to the second cylindrical lens 81b is d1. The distance from the second cylindrical lens 81b to the workpiece is d2. Lastly, the diameter of the laser beam L is $\phi$. In this case, the major axis D1 of the focusing spot S is such that $D1 = [\phi\{f1-(d1+d2)\}] \div f1$. Thus, the major axis D1 of the focusing spot S can be changed in length by changing the distance d1 from the first cylindrical lens 81a to the second cylindrical lens 81b and/or the distance d2 from the second cylindrical lens 81b to the workpiece. On the other hand, the minor axis D2 of the ellipsoidal focusing spot S of the laser beam directed through the first and second cylindrical lenses 81a, 81b is such that $D2 = \phi(f2-d2) \div f2$.

The description will be continued with reference again to FIG. 1. Imaging means 17 for detecting an area to be laser-processed by the laser beam irradiation means 52 is attached to the front end of the casing 521 constituting part of the laser beam irradiation means 52. This imaging means 17 is composed of an image pickup device (CCD) or the like and sends an image signal picked-up to the control means described later.

The laser processing machine of the illustrated embodiment is equipped with control means 20, which is composed of a computer. The control means 20 includes a central processing unit (CPU) 201 which performs arithmetic processing according to a control program; a read-only memory (ROM) 202 for storing the control program and the like; a readable and writable random access memory (RAM) 203 for storing data on the design values of a workpiece described later, calculation results and the like; a counter 204; and an input interface 205 and an output interface 206. The input interface 205 of the control means 20 is adapted to receive detection signals from process-transfer amount detection means 374, indexing-transfer amount detection means 384, the imaging means 17 and the like. The output interface 206 of the control means 20 is adapted to output control signals to the pulse motor 372, the pulse motor 382, the pulse motor 432, a pulse motor 532, the pulse laser beam oscillation means 522 of the pulse laser beam irradiation means 52, the first acoustooptic deflection means 61, the second acoustooptic deflection means 62, the pulse motor 161 of the interval adjusting means 10 and the like. Incidentally, the random access memory (RAM) 203 is provided with a first memory area 203a adapted to store data on the design values of process lines formed on the workpiece described later, with a second memory area 203b adapted to store data on detection values described later, and with other memory areas.

Figure 13:
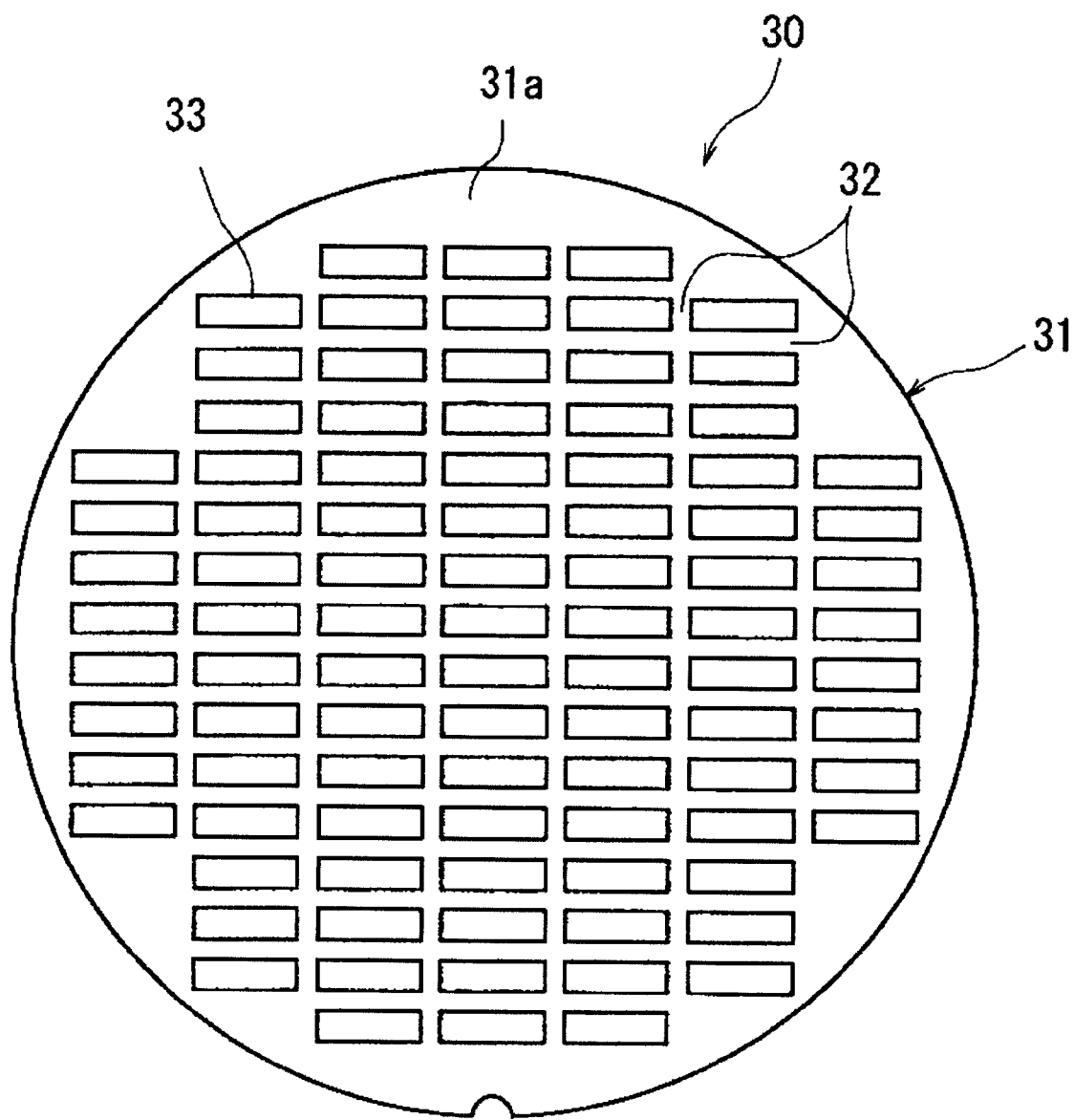
FIG. 13 is a plan view of a wafer formed with printer heads as a workpiece.
Figure 14A:
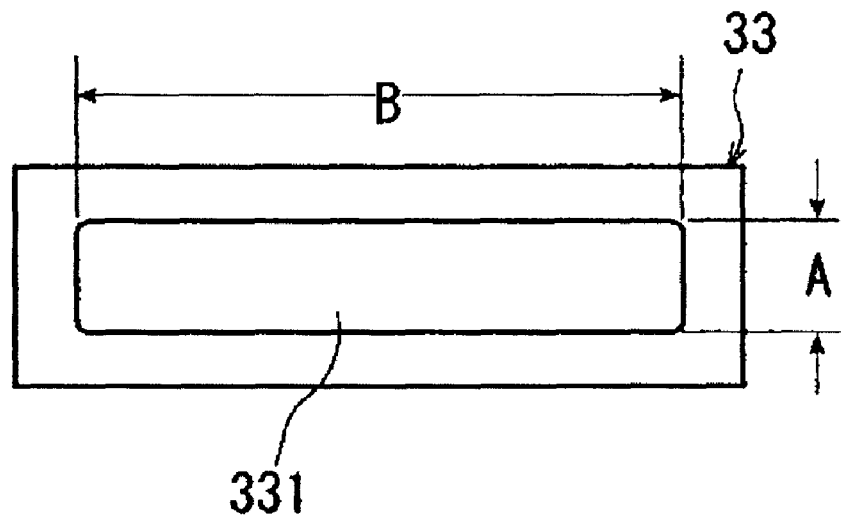
FIGS. 14A and 14B are explanatory diagrams of an ink-holder trench processed in the printer head formed in the wafer shown in FIG. 13.
Figure 14B:
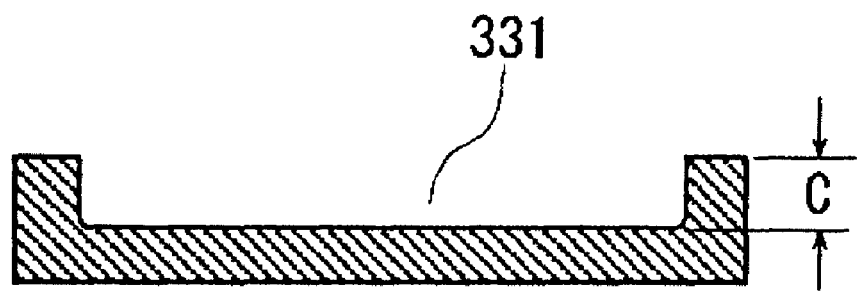

The laser processing machine of the present embodiment is configured as above. The operation of the laser processing machine will be described below. FIG. 13 illustrates a wafer 30 in which a substrate 31 made of silicon is formed on a surface 31a with a plurality of streets 32 arranged in a lattice manner to section the surface 31a into a plurality of areas formed with respective printer heads 33. As shown in FIGS. 14A and 14B, the printer head 33 is formed with an ink-holder trench 331 having a width A, length B and depth C. The data (design values) on XY-coordinate values such as the positions of the printer heads 33 formed in the surface 31a of the substrate 31, the positions and sizes of the ink-holder trenches 331 to be formed in the printer heads 33 as described above are stored in the first memory area 203a of the random access memory (RAM) 203 included in the control means 20.

A description is next made of processing of the ink-holder trench 331 formed in the printer head 33 described above by way of example. The wafer 30 as a workpiece is first placed on the chuck table 36 of the laser processing machine illustrated in FIG. 1. Suction means not shown is actuated to suck and hold the wafer 30 on the chuck table 36. The chuck table 36 on which the wafer 30 is sucked and held is positioned immediately below the imaging means 17 by the process-transfer means 37. After the chuck table 36 has been positioned immediately below the imaging means 17, alignment work is executed by the imaging means 17 and the control means not shown to detect a process-area of the wafer 30 to be laser-processed.

Figure 15A:
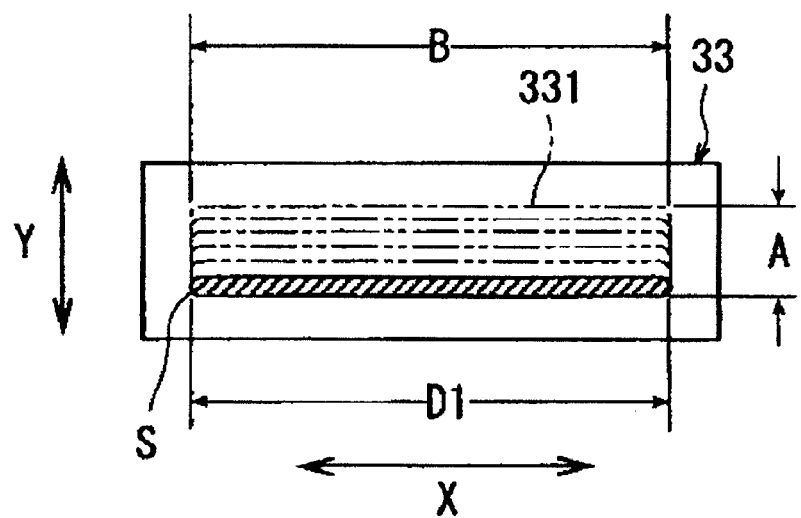
FIGS. 15A and 15B are explanatory diagrams illustrating an ink-holder trench as an example processed in a printer head formed in the wafer shown in FIG. 13 by the laser processing machine shown in FIG. 1.

After the alignment work has been executed to detect the process-area, to be laser-processed, of the wafer 30 held on the chuck table 36, the control means 20 actuates the process-transfer means 37 to move the chuck table 36 at a laser beam irradiation area where the concentrator 72 of the laser beam irradiation means 52 is positioned and locates the central position of a predetermined printer head 33 at a position immediately below the concentrator 72. The length B of the ink-holder trench 331 to be formed in the printer head 33 may be relatively short as shown in FIG. 15A. In this case, the control means 20 actuates the pulse motor 161 of the interval adjusting mechanism 10 to move the second support table 13. Thus, the interval between the second cylindrical lens unit 8b attached to the first support table 12 and the first cylindrical lens unit 8a attached to the second support table 13 is adjusted so that the major axis D1 of the focusing spot S of the pulse laser beam emitted from the concentrator 72 may be coincident with the length B of the ink-holder trench 331 to be formed in the printer head 33.

Figure 15B:
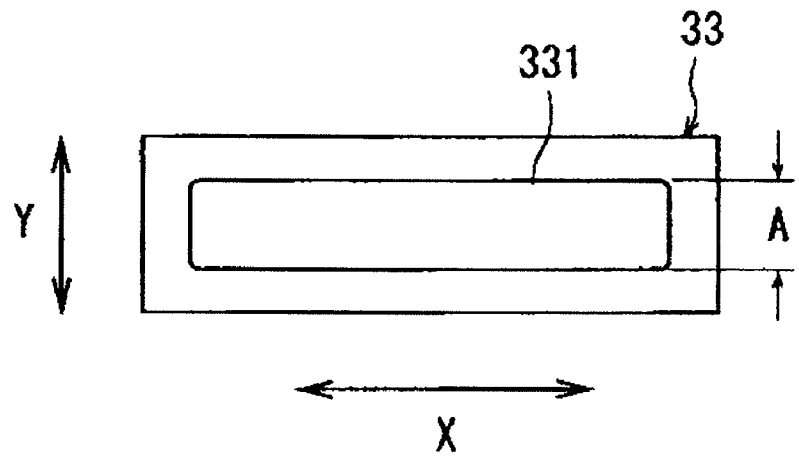

In this way, the adjustment is made so that the major axis D1 of the focusing spot S of the pulse laser beam emitted from the concentrator 72 may be coincident with the length B of the ink-holder trench 331 to be formed in the printer head 33. After the adjustment, the control means 20 actuates the pulse laser beam oscillation means 522 to apply a voltage of e.g. 10 V to the first deflection angle adjusting means 614 of the first acoustooptic deflection means 61, thereby controlling the pulse laser beam to the focusing spot Pb in FIG. 3. In addition, the control means 20 sequentially changes voltage applied to the second defection angle adjusting means 624 of the second acoustooptic deflection means 62 to sequentially shift the focusing spot S in the Y-axial direction (the minor-axial direction of the focusing spot S) by a distance corresponding to the width A of the ink-holder trench 331 to be formed. By repeatedly executing the shifting operation of the focusing spot S of the pulse laser beam a plurality of times, the ink-holder trench 331 having the width A, length B and depth C can be formed as shown in FIG. 15B. Incidentally, the pulse laser beam emitted from the pulse laser beam oscillation means 522 is set at a wavelength of e.g. 355 nm with absorbability relative to a silicon substrate and at an average output of e.g. 10 W.

After the predetermined printer head 33 is formed with the ink-holder trench 331 as described above, the control means 20 actuates the process-transfer means 37 and the first indexing-transfer means 38 to move the chuck table 36, thereby locating an unprocessed printer head 33 formed on the wafer 30 held on the chuck table 36 at a position immediately below the concentrator 72. The control means 20 then executes laser-processing to form the ink-holder groove 331 mentioned above. In this way, all the printer heads 33 formed on the wafer 30 held on the chuck table 36 are formed with ink-holder trenches 331.

Figure 16A:
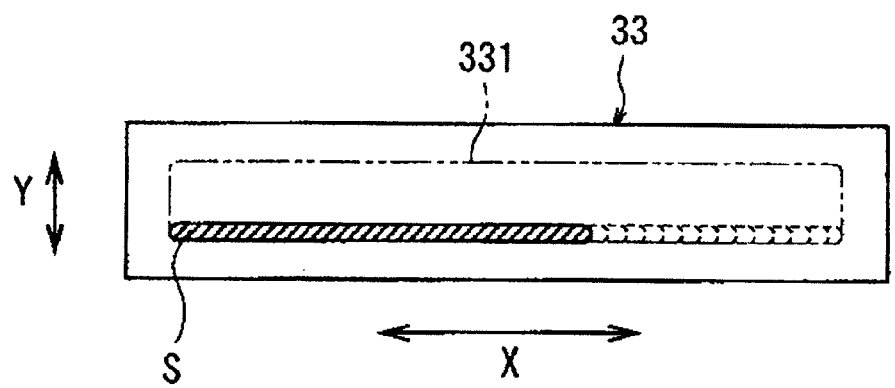
FIGS. 16A, 16B and 16C are explanatory diagrams illustrating an ink-holder trench as another example processed in a printer head formed in the wafer shown in FIG. 13 by the laser processing machine shown in FIG. 1.
Figure 16B:
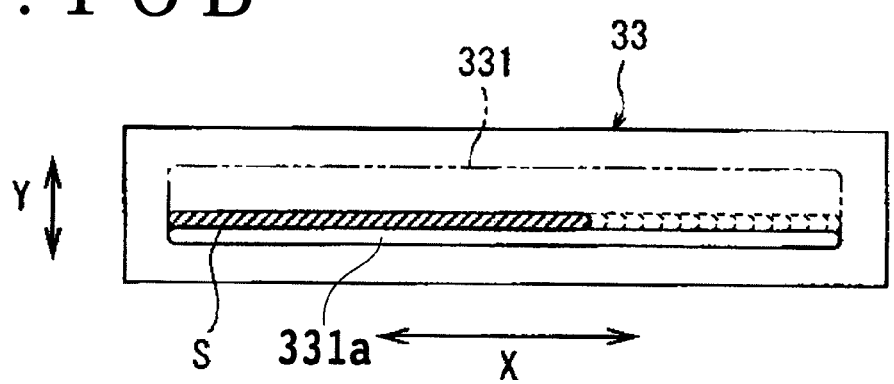
Figure 16C:
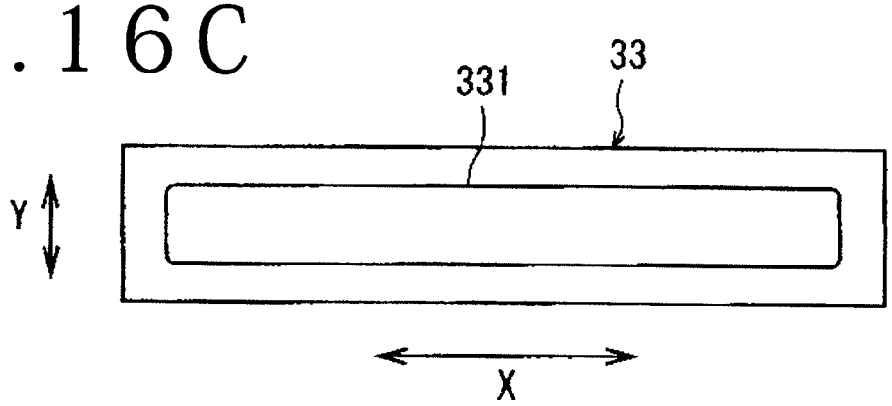
Figure 17:
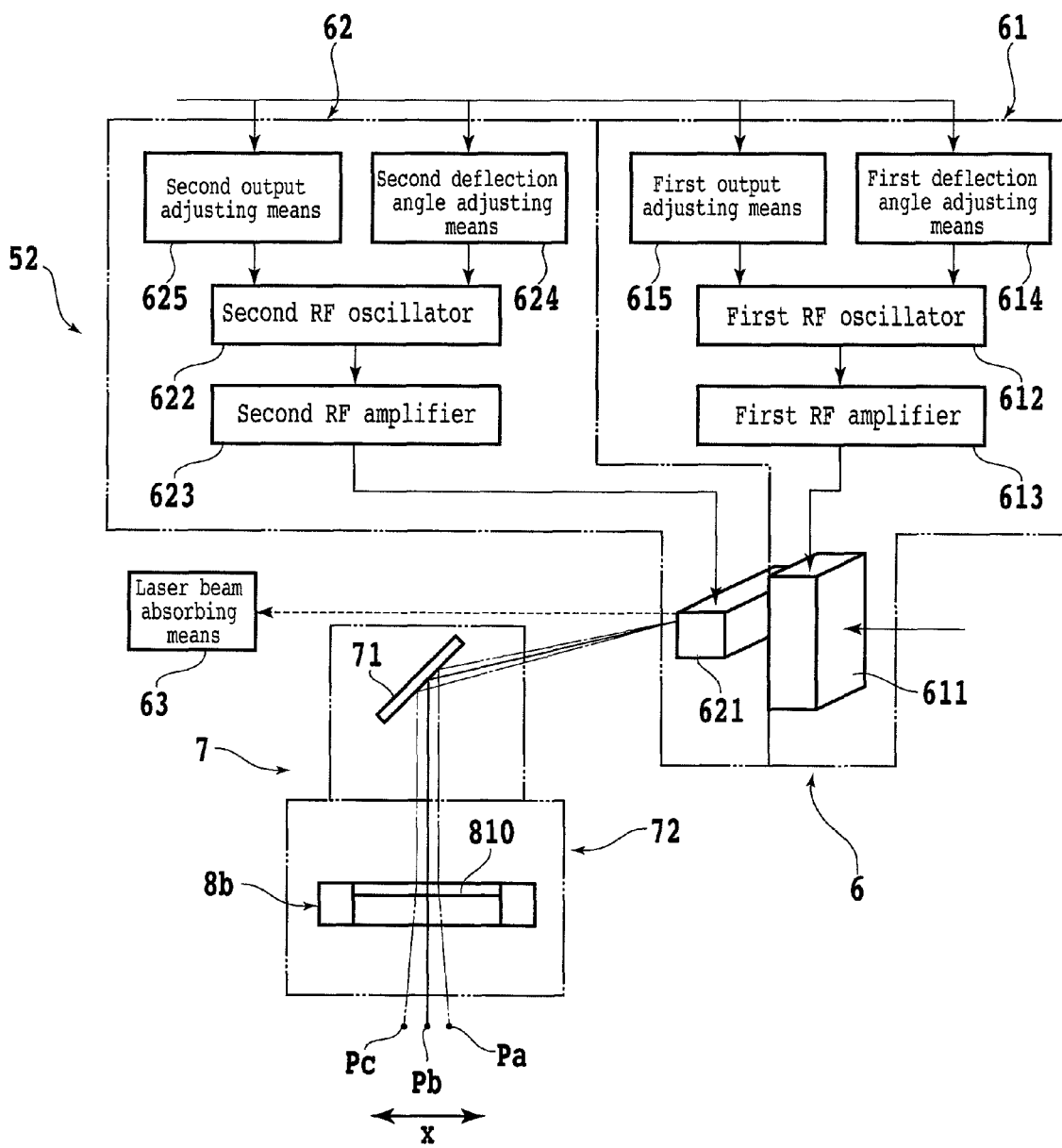
FIG. 17 is a block diagram of laser beam irradiation means installed on the laser processing machine shown in FIG. 1, according to another embodiment.

A description is next made of an explanatory process in the case where the length B of the ink-holder trench 331 formed in the printer head 33 with reference to FIGS. 16A, 16B and 16C is large. Respective voltages applies to the first deflection angle adjusting means 614 of the first acoustooptic deflection means 61 and to the second deflection angle adjusting means 624 of the second acoustooptic deflection means 62 are adjusted so that the focusing spot S of the pulse laser beam may be located at the left end of the lower side of an ink-holder groove 331 to be formed in the printer head 33 in FIG. 16A. While voltage applied to the second deflection angle adjusting means 624 of the second acoustooptic deflection means 62 is fixed, voltage applied to the first deflection angle adjusting means 614 of the first acoustooptic deflection means 61 is sequentially changed to sequentially shift the focusing spot S in the X-axial direction (the major axial direction of the focusing spot S) in a range where the ink-holder trench 331 to be formed reaches the right end in the figures. By repeatedly executing the operation of shifting the focusing spot S of the pulse laser beam a plurality of times, the laser-processed trench 331a is formed that has the length B, the depth C and a width corresponding to the minor axis D1 of the focusing spot S as shown in FIG. 16B.

Next, voltage applied to the second deflection angle adjusting means 624 of the second acoustooptic deflection means 62 is adjusted so that the focusing spot S of the pulse laser beam may be located at an upper portion of the laser-processing trench 331a. In addition, voltage applied to the first deflection angle adjusting means 614 of the first acoustooptic deflection means 61 is sequentially changed to sequentially shift the focusing spot S in the X-axial direction (in the major axial direction of the focusing spot S) in a range where it reaches the right end of the ink-holder trench 331 in the figures. The operation of shifting the focusing spot S of the pulse laser beam is repeatedly executed a plurality of times. In this way, the shifting operation is executed until the focusing spot S of the pulse laser beam reaches the upper side of the ink-holder trench 331 to be formed in the printer head 33 in FIGS. 16A and 16B. Thus, the ink-holder trench 331 having the width A, the length B and the depth C can be formed as shown in FIG. 16C.

As described above, even if the laser processing machine in the illustrated embodiment forms a trench larger than the focusing spot S of the pulse laser beam, the respective voltages applied to the first deflection angle adjusting means 614 of the first acoustooptic deflection means 61 and to the second deflection angle adjusting means 624 of the second acoustooptic deflection means 62 are controlled to shift the focusing spot S to form a trench having the predetermined width A, the length B and the depth C. Thus, since it is not necessary to move the chuck table holding the workpiece, processing speed can be increased to enhance productivity.

A description is next given of another embodiment of a laser processing machine according to the present invention with reference to FIGS. 17, 18A, 18B and 18C. This embodiment illustrated in FIGS. 17 and 18A to 18C is such that ellipsoidal focusing spot forming means of a concentrator 72 constituting part of laser beam irradiation means 52 is composed of only a cylindrical lens which is a concave lens. The other configurations may substantially be the same as those of the embodiment described above. Therefore, like members are given like reference numerals and their detailed explanations are omitted.

In the embodiment illustrated in FIGS. 17 and 18A to 18C, a laser beam L is focused in a Y-axial direction by a cylindrical lens 810 composed of a convex lens. On the other hand, the cylindrical lens composed of the convex lens does not focus light in the X-axial direction. Thus, the focusing spot S of the laser beam is shaped in an ellipse with a major axis D1 and a minor axis D2 as shown in FIG. 18C. The length of the major axis D1 of the focusing spot S is equal to the diameter of the laser beam L.

As described above, in the embodiment illustrated in FIGS. 17 and 18A to 18C, the ellipsoidal focusing spot forming means is composed of only the cylindrical lens which is a convex lens. Therefore, although the length of the major axis D1 of the focusing spot S may not be changed, the focusing spot S can be shifted in the direction of the major axis D1 and/or in the direction of the minor axis D2 by controlling voltage applied to the first deflection angle adjusting means 614 of the first acoustooptic deflection means 61 and/or to the second deflection angle adjusting means 624 of the second acoustooptic deflection means 62. Thus, a trench having a predetermined width, length and depth can be formed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing machine comprising:
    a chuck table adapted to hold a workpiece thereon; and
    laser beam irradiation means for applying a laser beam to the workpiece held on the chuck table;
    wherein said laser beam irradiation means includes laser beam oscillation means for emitting a pulse laser beam, deflection means for deflecting the pulse laser beam emitted from the laser beam oscillation means; and a concentrator having ellipsoidal focusing spot forming means for focusing the pulse laser beam deflected by the deflection means and for forming a focusing spot into an ellipse; wherein:

said ellipsoidal focusing spot forming means includes a first cylindrical lens composed of a concave lens; a second cylindrical lens composed of a convex lens disposed on the downstream side of the first cylindrical lens in a laser beam irradiation direction; a first turning adjustment means for turning the first cylindrical lens; a second turning adjustment means for turning the second cylindrical lens; a first movement adjusting means for moving said first cylindrical lens in a direction perpendicular to the light-focusing direction of said first cylindrical lens; a second movement adjusting means for moving said second cylindrical lens in a direction perpendicular to the light-focusing direction of said second cylindrical lens; and an interval adjusting mechanism which adjusts the interval between the first cylindrical lens and the second cylindrical lens.

2. The laser processing machine according to claim 1, wherein said ellipsoidal focusing spot forming means is composed of a cylindrical lens which is a convex lens.

3. The laser processing machine according to claim 1, further comprising a pair of guide rails along which the chuck table moves in a first direction, and a pair of slide blocks along which the chuck table moves in a second direction perpendicular to the first direction.

4. The laser processing machine according to claim 1, wherein said deflection means is composed of acoustooptic deflection means that includes an acoustooptic element which deflects the pulse laser beam emitted by the laser beam oscillation means, an RF oscillator which applies an RF to the acoustooptic element, and a deflection angle adjusting means for adjusting the frequency of the RF output from the RF oscillator; and wherein said deflection means deflects the pulse laser beam emitted from the laser beam oscillation means in a direction of a major axis of an ellipsoidal focusing spot onto which the pulse laser beam is focused by the concentrator.

5. The laser processing machine according to claim 1, wherein said deflection means is composed of acoustooptic deflection means that includes an acoustooptic element which deflects the pulse laser beam emitted by the laser beam oscillation means, an RF oscillator which applies an RF to the acoustooptic element, and a deflection angle adjusting means for adjusting the frequency of the RF output from the RF oscillator; and wherein said deflection means deflects the pulse laser beam emitted from the laser beam oscillation means in a direction of a minor axis of an ellipsoidal focusing spot onto which the pulse laser beam is focused by the concentrator.

6. The laser processing machine according to claim 1, wherein said deflection means includes:

first acoustooptic deflection means that includes a first acoustooptic element which deflects a pulse laser beam emitted by the laser beam oscillation means, a first RF oscillator which applies an RF to the first acoustooptic element, and first deflection angle adjusting means for adjusting the frequency of the RF output from the first RF oscillator, said first acoustoopic deflection means deflecting the pulse laser beam emitted by the laser beam oscillation means in a direction of a major axis of an ellipsoidal focusing spot onto which the pulse laser beam is focused by the concentrator, and second acoustooptic deflection means that includes a second acoustooptic element which deflects the pulse laser beam emitted by the laser beam oscillation means, a second RF oscillator which applies an RF to the second acoustooptic element, and second deflection angle adjusting means for adjusting the frequency of the RF output from the second RF oscillator, said second acoustooptic deflecting means deflecting the pulse laser beam emitted by the laser beam oscillation means in a direction of a minor axis of an ellipsoidal focusing spot onto which the pulse laser beam is focused by the concentrator.

* * * * *